US012691479B2

(12) United States Patent
Lee et al.

(10) Patent No.: US 12,691,479 B2
(45) Date of Patent: Jul. 28, 2026

(54) APPARATUS FOR SUPPLYING CHEMICAL LIQUID BY AUTOMATIC PROCESS AND THEREOF

(71) Applicant: SOLIS CO., LTD., Cheonan-si (KR)

(72) Inventors: Jongpil Lee, Hwaseong-si (KR); Daesuk Jeoung, Hwaseong-si (KR)

(73) Assignee: SOLIS CO., LTD., Cheonan-si (KR)

( * ) Notice: Subject to any disclaimer, the term of this patent is extended or adjusted under 35 U.S.C. 154(b) by 692 days.

(21) Appl. No.: 18/201,170

(22) Filed: May 23, 2023

(65) Prior Publication Data

US 2024/0278273 A1 Aug. 22, 2024

(30) Foreign Application Priority Data

Feb. 16, 2023 (KR) ........................ 10-2023-0020770

(51) Int. Cl.

| | |
|---|---|
| ***B08B 9/08*** | (2006.01) |
| ***B01F 31/10*** | (2022.01) |
| ***B05B 12/08*** | (2006.01) |
| ***B05B 15/30*** | (2018.01) |
| ***B05B 15/55*** | (2018.01) |
| *B01F 101/00* | (2022.01) |

(52) U.S. Cl.

CPC ............ *B08B 9/0817* (2013.01); *B01F 31/10* (2022.01); *B05B 12/081* (2013.01); *B05B 15/30* (2018.02); *B05B 15/55* (2018.02); *B01F 2101/2204* (2022.01)

(58) Field of Classification Search

CPC ....... B08B 9/0817; B05B 15/30; B05B 15/55; B05B 12/081; B01F 31/10; B01F 2101/2204

USPC .......................................................... 134/150

See application file for complete search history.

(56) References Cited

U.S. PATENT DOCUMENTS 5,368,652 A * 11/1994 Mullinax .................. B09B 3/35
134/25.4

FOREIGN PATENT DOCUMENTS

| | | | |
|---|---|---|---|
| EP | 3659702 | A1 | 6/2020 |
| JP | 2015-034016 | A | 2/2015 |
| KR | 10-2009-0124419 | A | 12/2009 |
| KR | 10-1648333 | B1 | 8/2016 |
| KR | 10-2017-0017956 | A | 2/2017 |

(Continued)

OTHER PUBLICATIONS

KR20220113121A—machine translation (Year: 2022).*

*Primary Examiner* — Tinsae B Ayalew
(74) *Attorney, Agent, or Firm* — Park, Kim & Suh, LLC

(57) ABSTRACT

The present disclosure relates to an apparatus and method for supplying a chemical liquid using an automated process. The apparatus includes: a drum washer unit configured to wash a drum keeping a chemical liquid; a drum shaker unit configured to mix a chemical liquid in a drum conveyed from the drum washer unit by rotating the drum; at least one chemical liquid ejector unit configured to eject a chemical liquid, which is kept in a drum conveyed from the drum shaker unit, to the outside using a dip tube; and a controller configured to perform control such that a drum finishes being used at the chemical liquid ejector unit is replaced with a new drum by operating at least one of the drum washer unit and the drum shaker unit for the new drum when the amount of a chemical liquid remaining in the drum at the chemical liquid ejector unit becomes a predetermined amount or less.

11 Claims, 7 Drawing Sheets

(56) References Cited

FOREIGN PATENT DOCUMENTS

| | | | | | |
|---|---|---|---|---|---|
| KR | 10-1917943 | B1 | | 11/2018 | |
| KR | 10-2022-0099379 | A | | 7/2022 | |
| KR | 10-2022-0113121 | A | | 8/2022 | |
| KR | 20220113121 | A | * | 8/2022 | ............... B67B 3/20 |

* cited by examiner

APPARATUS FOR SUPPLYING CHEMICAL LIQUID BY AUTOMATIC PROCESS AND THEREOF

CROSS-REFERENCE TO RELATED PATENT APPLICATION

This application claims the benefit of Korean Patent Application No. 10-2023-0020770, filed on Feb. 16, 2023, in the Korean Intellectual Property Office, the disclosure of which is incorporated herein in its entirety by reference.

BACKGROUND OF THE INVENTION

Field of the Invention

The present disclosure relates to an apparatus and method for supplying a chemical liquid, and particularly, an apparatus and method for supplying a chemical liquid using an automated process instead of manual working by a worker.

Description of the Related Art

Various chemical liquids are used in facilities for manufacturing semiconductors, displays, secondary batteries, etc. or industries for manufacturing products using chemical liquids. There are a bottle type, a drum type, and a tank type as types of supplying chemical liquids and these types are selected in consideration of the uses, characteristics, etc. of chemical liquid.

A drum type is used for chemical Mechanical Polishing (CMP) slurry that is a kind of chemical liquids in accordance with the characteristics of slurry. As for a drum-type CMP slurry supply apparatus of the related art, in order to smoothly supply slurry, workers manually perform work of checking a slurry drum, mixing slurry in the slurry drum, fastening the slurry drum and the slurry supply apparatus to each other, washing a dip tube, inserting the dip tube into the slurry drum, operating the slurry apparatus, etc.

Since processes that use chemicals such as a semiconductor process use poisonous or flammable substances, workers work with specific chemical safety supplies and chemical resistant suit on. In this case, when a worker does not wear safety supplies or a chemical resistance suit, a safety accident of exposure to a chemical occurs. Further, there are problems that a mixing accident such as non-fitting of a used drum and a drum for replacement occurs due to manual work by a worker, the precision of processes is deteriorated and poor products are produced due to contamination of slurry by foreign substances entering the slurry, and it is difficult to uniformly mix slurry in a slurry drum and to uniformly supply slurry to external equipment that performs work using slurry.

SUMMARY OF THE INVENTION

The present disclosure relates to an apparatus and method for supplying a chemical liquid using an automated process, the apparatus and method efficiently and safely supplying a chemical liquid using an automated process.

In accordance with one aspect of the present disclosure, provided is an apparatus for supplying a chemical liquid, comprising: a drum washer unit configured to wash a drum keeping a chemical liquid; a drum shaker unit configured to mix a chemical liquid in a drum conveyed from the drum washer unit by rotating the drum; at least one chemical liquid ejector unit configured to eject a chemical liquid, which is kept in a drum conveyed from the drum shaker unit, to the outside using a dip tube; and a controller configured to perform control such that a drum finishes being used at the chemical liquid ejector unit is replaced with a new drum by operating at least one of the drum washer unit and the drum shaker unit for the new drum when the amount of a chemical liquid remaining in the drum at the chemical liquid ejector unit becomes a predetermined amount or less.

The chemical liquid ejector unit includes first and second chemical liquid ejector units that are different from each other, and the controller performs control such that the new drum is conveyed to the second chemical liquid ejector unit and a chemical liquid is ejected at the second chemical liquid ejector unit to the outside without supply discontinuance in consideration of an operation time of at least one of the drum washer unit and the drum shaker unit drum conveyer unit and a drum conveyance time when the chemical liquid in the drum that discharges the chemical liquid at the first chemical liquid ejector unit is used up.

The drum washer unit receives a drum by opening a front door, discharges a drum by opening a rear door, and washes a drum with the front and rear door closed, and uses at least one of washing solution spraying, air spraying, nitrogen ($N_2$) spraying, and ionizer washing.

The drum shaker unit includes: a drum receiver configured to receive a drum; and a drum holder configured to hold a drum received in the drum receiver, and the drum receiver rotates a drum 360° so that a chemical liquid and minute particles in the drum are uniformly mixed.

The dip tube has a spiral blade in a predetermined region from an end to another end of an outer surface thereof, and a through-hole for discharging a chemical liquid to the outside is formed in the dip tube.

The dip tube is rotated in a drum, and the controller controls a rotation speed of the dip tube such that uniformity of a chemical liquid in a drum is maintained within a predetermined range when the chemical liquid is discharged.

The chemical liquid ejector unit includes: a chemical liquid discharger unit configured to discharge a chemical liquid kept in a drum using the dip tube; a dip tube washer unit configured to wash the dip tube when the dip tube is inserted therein; and a chemical liquid injector unit configured to inject a chemical liquid, which has been discharged and circulated from the chemical liquid discharger unit, into a drum that discharges a chemical liquid at the chemical liquid discharger unit.

The chemical liquid discharger unit includes a coupler head to which the dip tube is detachably coupled using a dip tube connector, and the coupler head has a first pipe connector to which a pipe for discharging a chemical liquid kept in a drum is connected and a second pipe connector to which a pipe for injecting nitrogen ($N_2$) into a drum is connected.

The chemical liquid injector unit includes: a cap separator configured to separate a cap coupled to an outlet or an inlet of a drum; a third pipe connector to which a pipe for injecting a circulated chemical liquid into a drum is connected; and a drum fastener configured to be fastened to a drum, having a through-hole therein, and configured to inject a circulated chemical liquid into a drum.

The drum washer unit further includes a drum conveyer unit disposed among the drum washer unit, the drum shaker unit and the chemical liquid ejector unit and configured to convey drums, and the drum conveyer unit includes: a plurality of first roller shafts disposed with predetermined gaps therebetween in a width direction on a fixed frame; and a plurality of second roller shafts disposed with predetermined gaps therebetween in a longitudinal direction.

The second roller shafts are positioned lower than the first roller shafts and can move up/down, a plurality of first rollers are disposed with predetermined gaps therebetween on the first roller shafts, a plurality of second rollers are disposed with predetermined gaps therebetween on the second roller shafts, and the second rollers are each positioned between adjacent first roller shafts and upper ends of the second rollers are positioned lower than upper ends of the first rollers with the second roller shafts in an initial state.

According to the present disclosure, since a chemical liquid is supplied through an automated process, it is possible to prevent a danger that workers are exposed to poisonous chemical substances and it is possible to prevent inappropriate work due to mistakes of workers. Further, it is possible to increase precision of processes and the yield ratio of processes by preventing an accident of mixing of drums, and it is possible to quickly take measures when emergency situations occur.

DETAILED DESCRIPTION OF THE INVENTION

Hereinafter, embodiments of the present disclosure are described on the basis of the drawings. Detailed descriptions of well-known functions or configurations relating to the present disclosure will not be provided so as not to unnecessarily obscure the description of the present disclosure.

Figure 1:
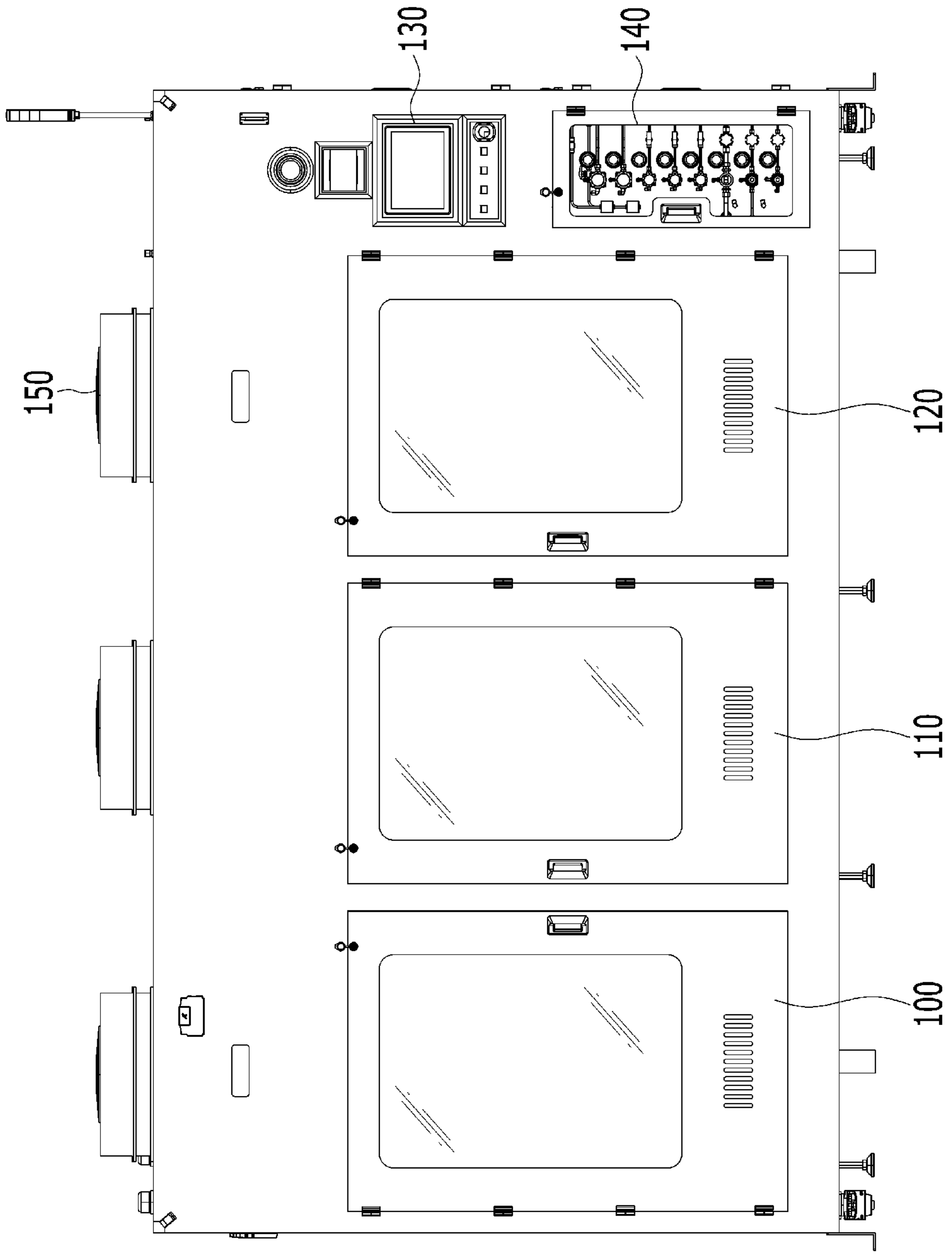
FIG. 1 is a view showing an apparatus for supplying a chemical liquid according to an embodiment of the present disclosure.
Figure 2:
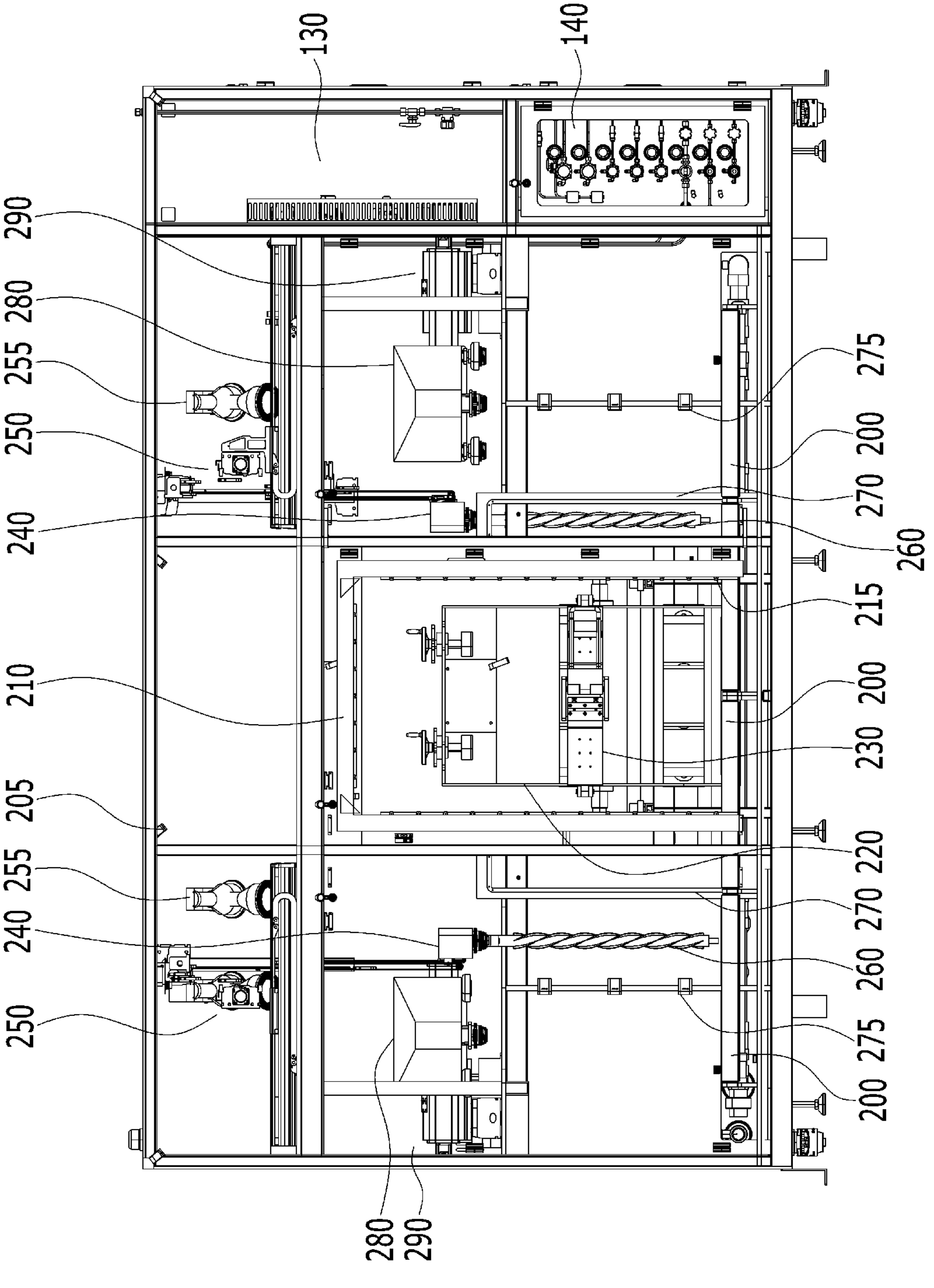
FIG. 2 is a view illustrating main components of the apparatus for supplying a chemical liquid according to an embodiment of the present disclosure.
Figure 3:
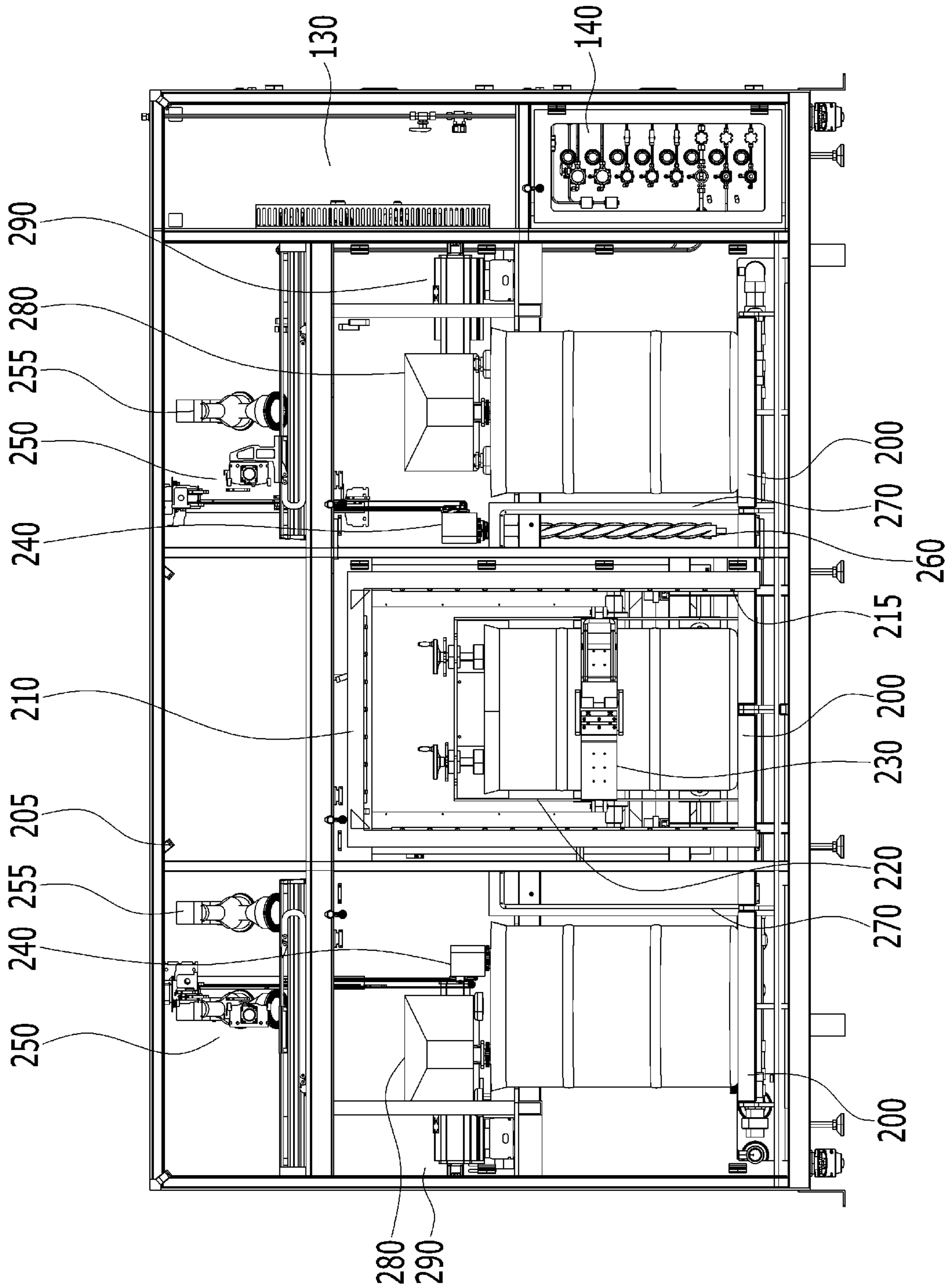
FIG. 3 is a view showing the state in which chemical liquid drums have been disposed in an apparatus for supplying a chemical liquid according to an embodiment of the present disclosure.

FIG. 1 is a view showing an apparatus for supplying a chemical liquid according to an embodiment of the present disclosure, FIG. 2 is a view illustrating main components of the apparatus for supplying a chemical liquid according to an embodiment of the present disclosure, and FIG. 3 is a view showing the state in which a chemical liquid drum has been disposed in an apparatus for supplying a chemical liquid according to an embodiment of the present disclosure.

Referring to FIGS. 1 to 3, an apparatus for supplying a chemical liquid of the present disclosure includes a first chemical liquid ejector unit 100, a drum shaker unit 110, a second chemical liquid ejector unit 120, a drum washer unit 210, a pneumatic unit 140, and a controller 130.

The apparatus for supplying a chemical liquid of the present disclosure, for example, may be configured such that the first chemical liquid ejector unit 100 is positioned at the left and the second chemical liquid ejector unit 120 is positioned at the right with the drum shaker unit 110 and the drum washer unit 210 therebetween, and the drum conveyer unit 200 is disposed under the first chemical liquid ejector unit 100, the drum shaker unit 110, the drum washer unit 210, and the second chemical liquid ejector unit 120, whereby it is possible to convey drums.

The first and second chemical liquid ejector units 100 and 120 are for supplying a chemical liquid stored in a chemical liquid drum (hereafter, referred to as "drum") to the outside. Since the apparatus for supplying a chemical liquid of the present disclosure uses the first and second chemical liquid ejector units 100 and 120, when the chemical liquid stored in the drum at any one of the chemical liquid ejector units is exhausted, the apparatus supplies a chemical liquid from the drum at the other chemical liquid ejector unit, whereby it is possible to continuously supply a chemical liquid to the outside without supply discontinuance of a chemical liquid due to replacement of a drum.

The drum washer unit 210 is for washing a drum before the drum is loaded when it is required to replace a drum and a new drum is loaded into the first or second chemical liquid ejector unit 100 or 200, and is positioned ahead of the drum shaker unit 110. The drum washer unit 210 has a front door and a rear door, so it can wash a drum in a sealed state. Further, the drum washer unit 210 has a plurality of sprayers 215 such as a nozzle on the top and the sides around the inlet thereof, so it is possible to wash a drum using various washing elements. In washing, a drum is moved forward or backward by the drum conveyer unit 200, so washing can be performed. For example, washing may perform washing solution spraying, air spraying, nitrogen ($N_2$) spraying, ionizer washing, etc., and may perform one of these or sequentially perform all of the washing processes.

As for a drum washing process, when a drum is loaded with the front door open, a cord sensing unit 205 senses a barcode or a QR code on the drum, thereby checking whether a replacement drum keeps the same chemical liquid as that of a used drum. Thereafter, the front door is closed and a washing process is performed for a predetermined time, and when washing is finished, the rear door is opened and the drum is conveyed to the drum shaker unit 110. In this case, sensing of a drum by the code sensing unit 205 may be performed at at least one of the drum washer unit 210 or the drum shaker unit 110.

The drum shaker unit 110 rotates a drum 360° such that the chemical liquid and minute particles in the drum are uniformly mixed. The drum shaker unit 110 includes a drum receiver 220 and a drum holder 230. The drum receiver 220 receives a drum and the drum holder 230 fixes the drum held in the drum container 220. When a drum is fixed in the drum receiver 220, the drum receiver 220 moves up the drum by a predetermined height and then rotates the drum to prevent the drum from hitting against the bottom of the drum shaker unit 110 in the process of rotation. In this process, the drum receiver 220 may rotate after moving itself up or moving up only a drum. The rotation speed of the drum receiver 220 is determined in consideration of the characteristic of a chemical liquid kept in a drum such that bubbles are not produced in the drum and minute particles are not damaged due to collision between the chemical liquid and the minute particles, and preferably, may be determined within 10 rpm~100 rpm. The drum shaker unit 110 may have a sensing unit that can sense the degree of mixing in a drum, and for example, may use ultrasonic waves.

The pneumatic unit 140 is for controlling ejection pressure when a chemical liquid is ejected through pipes from the first and second chemical liquid ejector unit 100 and 120.

The controller 130 generally controls the apparatus for supplying a chemical liquid of the present disclosure such as controlling ejection of a chemical liquid from the first and second chemical liquid ejector units 100 and 120, controlling washing of a drum at the drum washer unit 210, and controlling the drum rotation speed at the drum shaker unit 110.

For example, when a chemical liquid is ejected from the first chemical liquid ejector unit 100, the controller 130 can check the amount of a chemical liquid remaining in a drum positioned at the first chemical liquid ejector unit 100 using data sensed by a flow sensor and a hydraulic pressure sensor disposed in pipes. Alternatively, a capacity sensor may be disposed at the first chemical liquid ejector unit 100 and the controller 130 may check the amount of a chemical liquid remaining in a drum using the capacity sensor. When the amount of a chemical liquid remaining in a drum positioned at the first chemical liquid ejector unit 100 is a predetermined amount of less, the controller 130 can inform a manager that it is required to replace the drum.

When a manager loads a new drum into the drum washer unit 210, the controller 130 stops ejecting a chemical liquid from the first chemical liquid ejector unit 100 and checks in advance the point in time at which a chemical liquid is ejected from the second chemical liquid ejector unit 120. To this end, the controller 130 changes the chemical liquid ejection source between the first chemical liquid ejector unit 100 and the second chemical liquid ejector unit 120 so that a chemical liquid is supplied to the outside without discontinuance in consideration of time information for washing a drum at the drum washer unit 210, time information for rotating a drum at the drum shaker unit 110, information about drum conveyance time, fastening time information of a coupler and a drum at the second chemical liquid ejector unit 120, time information for ejecting a chemical liquid from the second chemical liquid ejector unit 120, etc. . . . When supply of a chemical liquid from the first chemical liquid ejector unit 100 is stopped, the controller 130 provides an alarm to a manager so that the manager takes out the drum from the first chemical liquid ejector unit 100.

As another embodiment of the present disclosure, a drum is prepared in advance at the drum shaker unit 110 when a chemical liquid is ejected from any one chemical liquid ejector unit of the first or second chemical liquid ejector unit 100 or 120, and in this case, when the amount of a chemical liquid remaining in a drum from which a chemical liquid is ejected becomes a predetermined amount or less, the controller 130 can control the drum shaker unit 110 to rotate the drum such that the drum is supplied to the chemical liquid ejector unit intended to eject a chemical liquid. In this case too, the controller 130 changes a chemical liquid feeing source between the first chemical liquid ejector unit 100 and the second chemical liquid ejector unit 120 by controlling the operation of the drum shaker unit 110, etc. in consideration of the time information for rotating a drum at the drum shaker unit 110, the time information for ejecting a chemical liquid from the second chemical liquid ejector unit 120, etc.

Further, the controller 130 provides a manager with information obtained in the process of supplying a chemical liquid, thereby being able to notify the manager of an urgent situation or an emergency situation when the situations occur, and being able to provide information to the manager by analyzing problems and solutions. For example, information about the optimal state for supplying a chemical liquid is stored in a storage (not sown). The optimal state information, for example, is information about a washed state of a drum after the drum is washed, information about a mixed state of a chemical liquid in a drum after the drum is shaken, information about uniformity of a chemical liquid in a drum when the chemical liquid is discharged, information about the ejection amount and pressure of a chemical liquid, information of cleanliness of the inside of the apparatus for supplying a chemical liquid, information showing whether there is gas leakage or liquid leakage, etc. When information about the current state obtained using various sensing units is different from a predetermined optimal state, the controller 130 can provide a manager with the fact of the difference between the current state and the optimal state, and a solution.

The solution may be derived by analyzing data related to problematic matters in the data stored in the storage. For example, when drum washing does not reach a predetermined state as the result of analyzing an image taken after washing a drum at the drum washer unit 210, it is possible to provide a manager with information about the washing state such that washing is additionally performed. In this case, it is possible to recommend information about a washing method, a washing time, etc. for increasing the washing effect to the manager, and washing can be performed through the proposed washing method if the manager approves.

When the mixed state in a drum after the drum is shaken does not reach a predetermined state, it is possible to recommend information about drum rotation, such as a drum rotation speed, a drum rotation number, and a drum rotation time, to the manager in consideration of the difference between the current mixed state in the drum and the predetermined state. In this case, the predetermined mixed state in a drum may be determined within a predetermined range.

Further, when chemical liquid uniformity in a drum is different from a predetermined state in discharge of the chemical liquid, it is possible to control the uniformity of the chemical liquid in the drum to reach the predetermined state by controlling the rotation speed of a dip tube disposed in the drum. In this case, the controller 130 can control the rotation speed of the dip tube such that the chemical liquid uniformity in the drum is maintained in a predetermined range, and the rotation speed of the dip tube is determined in consideration of the ejection speed, ejection pressure, ejection amount, or the like of the chemical liquid in a ejection pipe. For example, since problems such as wear of minute particles in a drum may be generated by fast rotation of a dip tube, the controller 130 may consider control of the ejection speed, ejection pressure, or ejection amount of a chemical liquid together with control of the rotation speed of the dip tube. For example, when chemical liquid uniformity in a drum is not in a predetermined range even though the rotation speed of a dip tube has reached a predetermined critical value, the controller 130 can control the ejection speed, ejection pressure, or ejection amount of the chemical liquid or provide relevant information to a manager such that the manager takes measures.

Further, when the cleanliness of the inside of the apparatus for supplying a chemical liquid does not reach a predetermined state, the controller 130 performs a process for increasing the cleanliness of the inside using various cleaning filters or increases the cleanliness of the inside using a ventilator 150. Further, when a gas or a liquid leaks, it is possible to stop ejecting a chemical liquid or reduce the degree of ejection of a chemical liquid and provide an alarm to a manager.

Further, the controller 130 can upgrade optimal state information, which can be applied when a chemical liquid is ejected from the apparatus for ejecting a chemical liquid, by leaning the matters related to the optimal state in ejection of a chemical liquid using deep learning, and can propose a more advanced solution using the upgraded optimal stat e information. For example, when a measure is taken for a certain problem or update information is input from a manager, it is possible to upgrade the optimal state by analyzing and learning corresponding data and it is possible to provide information to the manager by analyzing whether the current state is appropriate or needs to be improved by analyzing information about the current state obtained using various sensing units.

Meanwhile, the first and second chemical liquid ejector units 100 and 120 include the same components and are selectively operate in accordance with controlling by the controller 130. Hereafter, the first chemical liquid ejector unit 100 is described and it can be equally or similarly applied to the second chemical liquid ejector unit 120.

The first chemical liquid ejector unit 100 includes a chemical liquid discharger unit 240, a chemical liquid discharger unit movement controller 250, a camera 225, a dip tube 260, a dip tube washer unit 270, a chemical liquid uniformity sensing unit 275, a chemical liquid injector unit 280, and a chemical liquid injector unit movement controller 290.

The chemical liquid discharger unit 240 discharges the chemical liquid kept in a drum using the dip tube 260 and can be moved in a longitudinal direction (X axis), a width direction (Y axis), and up/down (Z axis) in accordance with controlling by the chemical liquid discharger unit movement controller 250.

The dip tube washer unit 270 is for washing the dip tube 260 and the chemical liquid discharger unit 240 puts the dip tube 260 into the dip tube washer unit 270 to be washed. Dip tube washing may be performed through a plurality of washing processes, for example, primary washing that sprays a washing solution such as De-ionized (DI) water, secondary washing that fills the dip tube washer unit 270 with the washing solution and then washes the dip tube using bubbles, and drying that discharges the washing solution from the dip tube washer unit 270 and then dries the drum by spraying air or nitrogen ($N_2$).

The camera 250 is for checking the position of a drum when the drum is loaded in the first chemical liquid ejector unit 100 and the controller 130 arranges a drum at a predetermined specific position using information taken by the camera 250, and fixes the drum using the drum holder when the drum is arranged at the specific position.

The chemical liquid uniformity sensing unit 275, which is for sensing uniformity of a chemical liquid in a drum positioned in the first chemical liquid ejector unit 100, senses uniformity of a chemical liquid in a drum at a plurality of positions using a plurality of sensors and may use ultrasonic waves. In this case, the first chemical liquid ejector unit 100 may further include a sensing unit that can sense uniformity of a chemical liquid that is discharged through an ejection pipe.

The chemical liquid injector unit 280 is for injecting a chemical liquid back into a drum in the process of circulating a chemical liquid ejected from the first chemical liquid ejector unit 100. When a tank, or the like is disposed between the apparatus for supplying a chemical liquid of the present disclosure and an external device that needs a chemical liquid and a chemical liquid is supplied to the external device from the tank, it is required to circulate a chemical liquid between the apparatus for supplying a chemical liquid of the present disclosure and the tank. To this end, the first chemical liquid ejector unit 100 discharges a chemical liquid through the chemical liquid discharger unit 240 and injects a chemical liquid into a drum through the chemical liquid injector unit 280. The chemical liquid injector unit 280 can be moved in a longitudinal direction (X axis) and the width direction (Y axis) in accordance with controlling by the chemical liquid injector unit movement controller 290.

As for the operation of the first chemical liquid ejector unit 100, when a drum is conveyed and positioned in the first chemical liquid ejector unit 100 from the drum shaker unit 110, the camera 250 photographs the position of the drum and the controller 130 controls the drum to be positioned at a predetermined position. When the drum is positioned at the predetermined position, the chemical liquid injector unit 280 separates a cap at the outlet of the drum from the drum and the chemical liquid discharger unit 240 discharges the chemical liquid in the drum to the outside by putting the dip tube 260 into the drum through the outlet of the drum. In this case, when it is required to circulate the chemical liquid, the chemical liquid injector unit 280 separates a gap at the inlet of the drum from the drum, the chemical liquid injector unit 280 and the drum are fastened, and the circulated chemical liquid is injected into the drum. When the chemical liquid finishes being supplied from the drum, the chemical liquid injector unit 280 couples the caps to the drum outlet and the drum inlet and transmits information about replacement of the drum, an alarm, or the like such that a manager can take the drum out of the first chemical liquid ejector unit 100.

Figure 4:
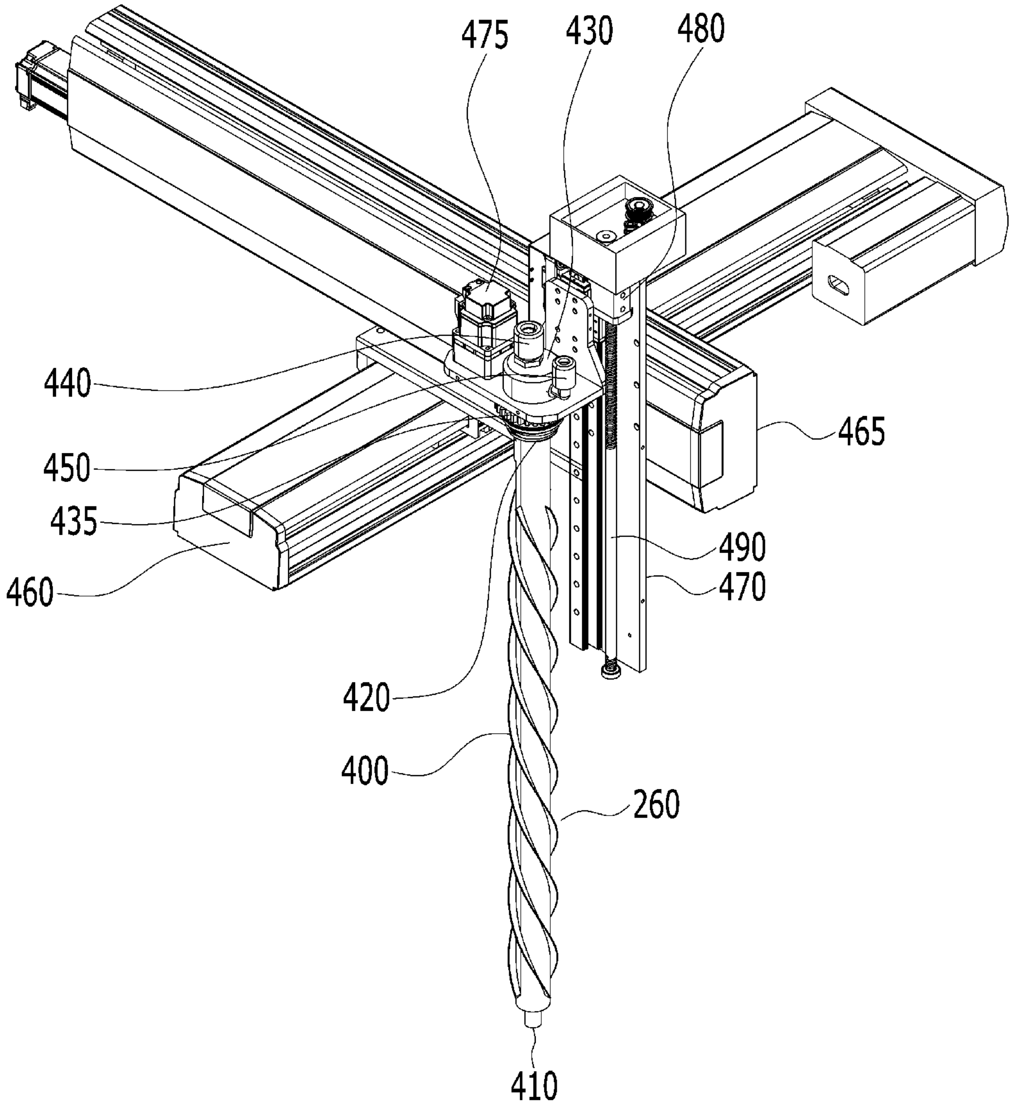
FIG. 4 is a view illustrating a chemical liquid discharger unit of the apparatus for supplying a chemical liquid according to an embodiment of the present disclosure.
Figure 5:
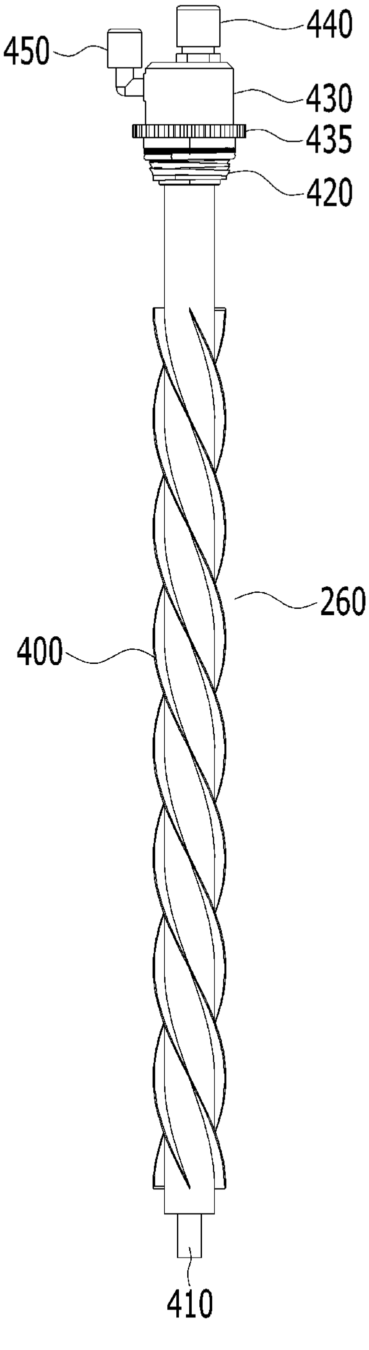
FIG. 5 is a view illustrating a coupler of the apparatus for supplying a chemical liquid according to an embodiment of the present disclosure.

FIG. 4 is a view illustrating the chemical liquid discharger unit 240 of the apparatus for supplying a chemical liquid according to an embodiment of the present disclosure and FIG. 5 is a view illustrating a coupler of the apparatus for supplying a chemical liquid according to an embodiment of the present disclosure.

Referring to FIGS. 4 and 5, the chemical liquid discharger unit 240 of the apparatus for supplying a chemical liquid of the present disclosure can move on the X axis, Y axis, and Z axis using first to third fixed frames 460, 465, and 470. The chemical liquid discharger unit 240 uses a motor to move, and for example, can move up/down along a movement shaft 490 by driving a motor unit 480 when moving on the Z axis and can move using separately provided motors when moving on the X axis and the Y axis too. Further, the chemical liquid discharger unit 240 has a coupler, the coupler includes a coupler head 430 and a dip tube 260, and the coupler head 430 and the dip tube 260 are detachably fastened using a dip tube connector 435.

The coupler head 430 has a first pipe connector 440 to which a pipe for discharging a chemical liquid kept in a drum is connected and a second pipe connector 450 to which a pipe for injecting nitrogen ($N_2$) into a drum is connected. Nitrogen is injected to maintain the pressure inside a drum and prevents external gas such as oxygen from flowing into the drum in the process of discharging a chemical liquid.

The dip tube has a spiral blade 400 in a predetermined region from an end to another end of the outer surface thereof and a through-hole 410 for discharging a chemical liquid to the outside is formed in the dip tube. The spiral blade 400 formed on the outer surface rotates using a motor unit 475, whereby it can maintain uniformity of a chemical liquid in a predetermined state such as keeping distribution of minute particles in the chemical liquid uniform in a drum. The dip tube is made of a material that does not chemically react with a chemical liquid, does not corrode, and does not wear minute particles in a chemical liquid, and for example, Teflon may be used.

As for the method of fastening the coupler and a drum, a first drum fastener 420 of the coupler and a drum are fastened with a dip tube inserted and positioned in the drum through the outlet of the drum, and the fastening method may use any one of a rotation type of fastening them by rotating the first drum fastener 420 or a pressing type of fastening them by pressing the first drum fastener 420.

Figure 6:
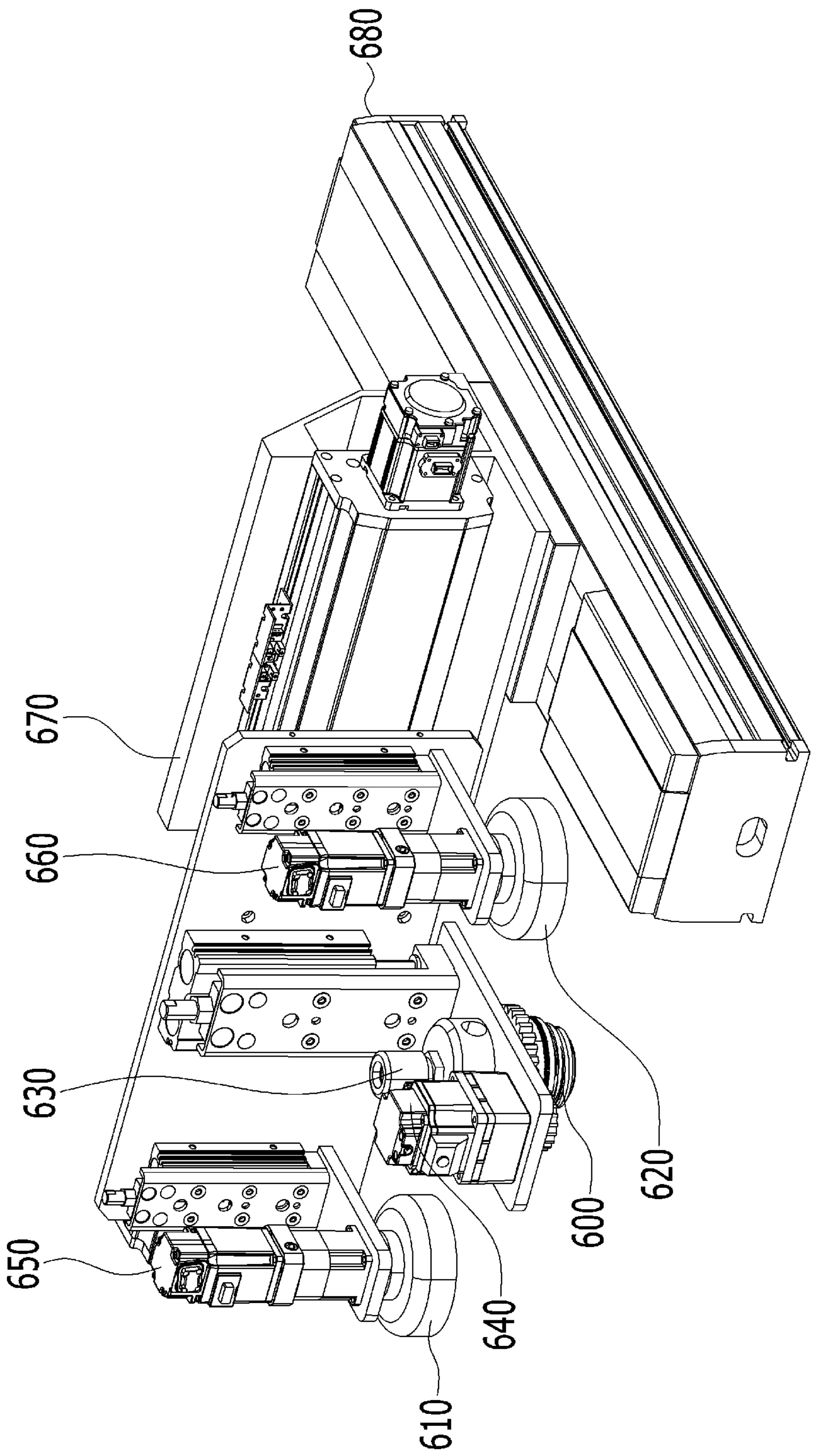
FIG. 6 is a view illustrating a chemical liquid injector unit of the apparatus for supplying a chemical liquid according to an embodiment of the present disclosure.

FIG. 6 is a view illustrating the chemical liquid injector unit 280 of the apparatus for supplying a chemical liquid according to an embodiment of the present disclosure.

Referring to FIG. 6, the chemical liquid injector unit 280 of the apparatus for supplying a chemical liquid of the present disclosure includes a second drum fastener 600, first and second cap separators 610 and 620, and a third pipe connector 630.

The chemical liquid injector unit 280 can move in the longitudinal direction and the width direction using fixed frames 670 and 680, the second drum fastener 600 and a drum are fastened to circulate and inject a discharged chemical liquid back into a drum, and the fastening method may use any one of a rotation type of fastening them by rotating the second drum fastener 600 using a motor unit 640 or a pressing type of fastening them by pressing the second drum fastener 600.

The first or second cap separator 610 or 620 can move up/down, separates and keeps a cap coupled to the outlet or the inlet of a drum using a motor unit 650 or 660, and couples the cap back to the outlet or the inlet when a chemical liquid finishes being supplied from the drum. The pipe for circulating and injecting a discharged chemical liquid back into a drum is coupled to the third pipe connector 630. The chemical liquid supplied through the third pipe connector 630 is injected into the drum through the through-hole formed in the second drum fastener 600.

Figure 7:
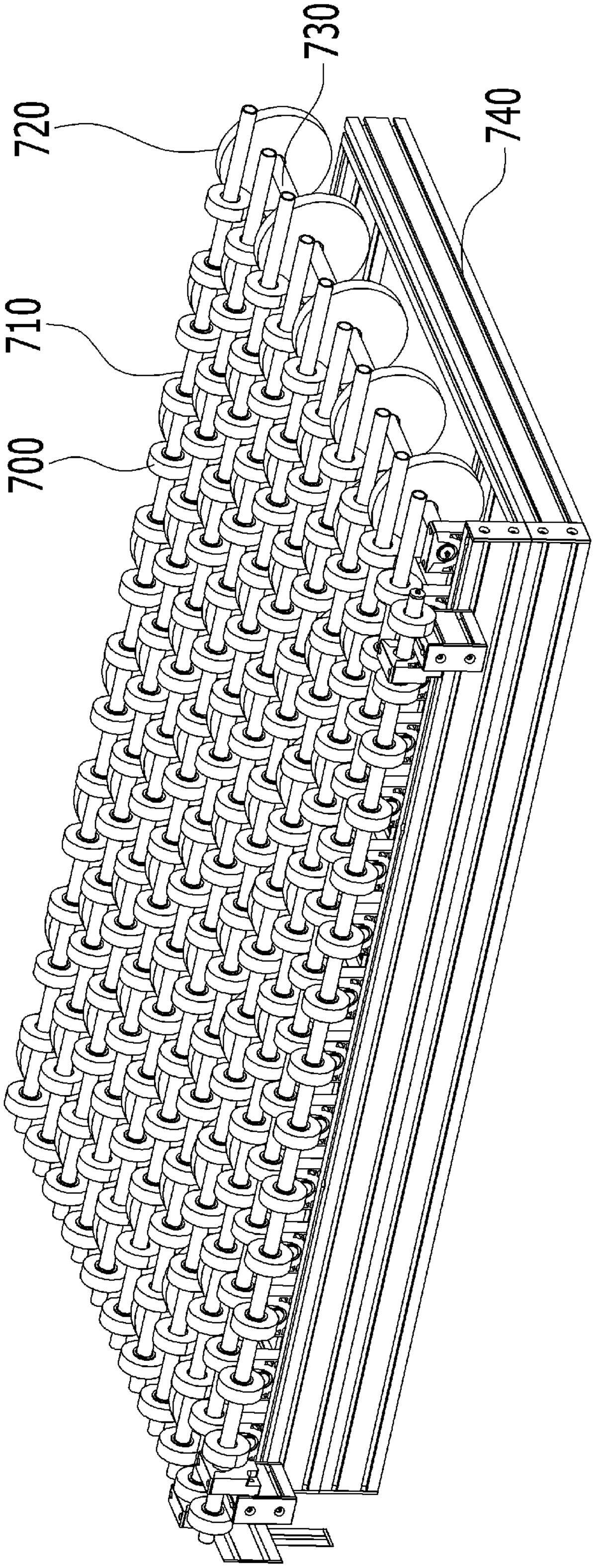
FIG. 7 is a view illustrating a drum conveyer unit of the apparatus for supplying a chemical liquid according to an embodiment of the present disclosure.

FIG. 7 is a view illustrating the drum conveyer unit 200 of the apparatus for supplying a chemical liquid according to an embodiment of the present disclosure.

Referring to FIG. 7, the drum conveyer unit 200 of the apparatus for supplying a chemical liquid according to an embodiment of the present disclosure includes pluralities of first and second roller shafts 710 and 730 on a fixed frame 740. A plurality of first roller shafts 710 is disposed with predetermined gap therebetween in the width direction and a plurality of second roller shafts 730 is disposed with predetermined gap therebetween in the longitudinal direction. The second roller shafts 730 are positioned lower than the first roller shafts 710 and can move up/down. A plurality of first rollers 700 is disposed with predetermined gaps therebetween on the first roller shafts 710 and a plurality of second rollers 720 is disposed with predetermined gaps therebetween on the second roller shaft 730. The second rollers 720 are each positioned between adjacent first roller shafts 710 and the upper ends of the second rollers 720 are positioned lower than the upper ends of the first roller 700.

When the second roller shafts 730 are maintained without being moved up in the process of moving a drum, it is possible to move the drum in the width direction by driving the first rollers 700 because the upper ends of the first rollers 700 are higher than the upper ends of the second rollers 720. Further, when the second roller shafts 730 are moved in the up-down direction and the upper ends of the second roller 720 are positioned higher than upper ends of the first rollers 700, it is possible to longitudinally move a drum by driving the second rollers 720.

What is claimed is:

1. An apparatus for supplying a chemical liquid, comprising:

a drum washer unit configured to wash a drum keeping a chemical liquid;

a drum shaker unit configured to mix a chemical liquid in a drum conveyed from the drum washer unit by rotating the drum;

at least one chemical liquid ejector unit configured to eject a chemical liquid, which is kept in a drum conveyed from the drum shaker unit, to the outside using a dip tube; and a controller configured to perform control such that a drum finishes being used at the chemical liquid ejector unit is replaced with a new drum by operating at least one of the drum washer unit and the drum shaker unit for the new drum when the amount of a chemical liquid remaining in the drum at the chemical liquid ejector unit becomes a predetermined amount or less.

2. The apparatus of claim 1, wherein the chemical liquid ejector unit includes first and second chemical liquid ejector units that are different from each other, and the controller performs control such that the new drum is conveyed to the second chemical liquid ejector unit and a chemical liquid is ejected at the second chemical liquid ejector unit to the outside without supply discontinuance in consideration of an operation time of at least one of the drum washer unit and the drum shaker unit and a drum conveyance time when the chemical liquid in the drum that discharges the chemical liquid at the first chemical liquid ejector unit is used up.

3. The apparatus of claim 1, wherein the drum washer unit receives a drum by opening a front door, discharges a drum by opening a rear door, and washes a drum with the front and rear door closed, and uses at least one of washing solution spraying, air spraying, nitrogen ($N_2$) spraying, and ionizer washing.

4. The apparatus of claim 1, wherein the drum shaker unit includes:

a drum receiver configured to receive a drum; and a drum holder configured to hold a drum received in the drum receiver, and the drum receiver rotates a drum 360° so that a chemical liquid and minute particles in the drum are uniformly mixed.

5. The apparatus of claim 1, wherein the dip tube has a spiral blade in a predetermined region from an end to another end of an outer surface thereof, and a through-hole for discharging a chemical liquid to the outside is formed in the dip tube.

6. The apparatus of claim 5, wherein the dip tube is rotated in a drum, and the controller controls a rotation speed of the dip tube such that uniformity of a chemical liquid in a drum is maintained within a predetermined range when the chemical liquid is discharged.

7. The apparatus of claim 1, wherein the chemical liquid ejector unit includes:

a chemical liquid discharger unit configured to discharge a chemical liquid kept in a drum using the dip tube;

a dip tube washer unit configured to wash the dip tube when the dip tube is inserted therein; and a chemical liquid injector unit configured to inject a chemical liquid, which has been discharged and circulated from the chemical liquid discharger unit, into a drum that discharges a chemical liquid at the chemical liquid discharger unit.

8. The apparatus of claim 7, wherein the chemical liquid discharger unit includes a coupler head to which the dip tube is detachably coupled using a dip tube connector, and the coupler head has a first pipe connector to which a pipe for discharging a chemical liquid kept in a drum is connected and a second pipe connector to which a pipe for injecting nitrogen ($N_2$) into a drum is connected.

9. The apparatus of claim 7, wherein the chemical liquid injector unit includes:

a cap separator configured to separate a cap coupled to an outlet or an inlet of a drum;

a third pipe connector to which a pipe for injecting a circulated chemical liquid into a drum is connected; and a drum fastener configured to be fastened to a drum, having a through-hole therein, and configured to inject a circulated chemical liquid into a drum.

10. The apparatus of claim 7, wherein the drum washer unit further includes a drum conveyer unit disposed among the drum washer unit, the drum shaker unit and the chemical liquid ejector unit and configured to convey drums, and the drum conveyer unit includes:

a plurality of first roller shafts disposed with predetermined gaps therebetween in a width direction on a fixed frame; and a plurality of second roller shafts disposed with predetermined gaps therebetween in a longitudinal direction.

11. The apparatus of claim 10, wherein the second roller shafts are positioned lower than the first roller shafts and can move up/down, a plurality of first rollers are disposed with predetermined gaps therebetween on the first roller shafts, a plurality of second rollers are disposed with predetermined gaps therebetween on the second roller shafts, and the second rollers are each positioned between adjacent first roller shafts and upper ends of the second rollers are positioned lower than upper ends of the first rollers with the second roller shafts in an initial state.

* * * * *